Patented Oct. 24, 1950

2,526,674

UNITED STATES PATENT OFFICE 2,526,674

WELL CEMENTING COMPOSITION

Delmar H. Larsen, West Hollywood, Calif., assignor to National Lead Company, Los Angeles, Calif., a corporation of New Jersey No Drawing. Application July 5, 1943,
Serial No. 493,595

2 Claims. (Cl. 106—97)

This invention relates to the cementing of wells and has particular application to oil and gas wells, although it is applicable to wells generally.

In the practice of cementing wells a pumpable slurry of hydraulic cement is forced down a casing to be cemented and up outside thereof to the extent necessary to seal off the formation to be cemented. Sometimes a weighting material, such as barytes or iron oxide, is added to the slurry in order to increase its density. In order, however, to secure a high density it is necessary to employ a weighting material of comparatively coarse mesh, viz. 100 mesh (per linear inch) as distinguished from 325 mesh at which fineness a weighting material is ordinarily employed in a drilling fluid or mud. Such coarse weighting material is however, subject to settling. Moreover, a cement slurry containing a weighting material of such coarse mesh also exhibits a so-called "false body" or quasi-dilatant packing or stiffening up when an attempt is made to pump it, caused by the granules of weighting material jamming up when slurries are made in the regions of maximum pumpable density of high cement-water ratios.

Some of the objects of this invention, therefore, are to overcome the above noted drawbacks of the employment of a weighted cement slurry by providing a novel well cementing material, a novel pumpable cement slurry and a novel process of well cementing.

Further objects will appear from the detail description in which will be set forth an illustrative embodiment of this invention; it is to be understood, however, that this invention is susceptible of various embodiments within the scope of the appended claims without departing from the spirit of this invention.

Generally stated, and in accordance with this invention, there is provided a pumpable, finally settable cement slurry for cementing wells, having in addition to its water phase, hydraulic cement and a weighting material in amounts sufficient to form a slurry, with the weighting material in a concentration sufficient to impart to the slurry the desired density. There is combined with this slurry an emulsoid colloid in a concentration sufficient to prevent dilatant packing of the slurry when pumped.

Generally stated, and in accordance with an illustrative embodiment of this invention, the slurry employed for cementing the well comprises hydraulic cement, a weighting material and an emulsoid colloid. The hydraulic cement may be any suitable one generally employed in well cementing, an example being Portland cement. The weighting material may comprise ground barytes, iron oxide or other suitable weighting materials; it is preferable, however, that the weighting material be ground to a mesh of about 100 (per linear inch) in order to secure the highest density or specific gravity. The emulsoid colloid is preferably bentonite, because of its cheapness and availability; however, other emulsoid colloids, such as one of the seaweeds like Irish Moss or one of the gums like gum karaya, may be employed. The percentage of the emulsoid colloid is, however, much less than that employed in cementing generally, for the percentage is about one half of one per cent, in the case of bentonite, as distinguished from 2 to 4% where bentonite has been used in connection with Portland cement.

In the process embodying this invention, the materials may be introduced into the well in the usual manner where cementing is resorted to. The weighting material is introduced into the slurry in an amount dependent upon the desired specific gravity to be attained. The emulsoid colloid is introduced to accomplish its purpose. The three materials, hydraulic cement, weighting material and the emulsoid colloid may be introduced separately or together. The three materials may, in fact, be made up into a dry mixture in the proportions desired, so as to form a well cementing material. This mixture can then be introduced by any suitable mixing device as heretofore employed in introducing cement and water.

The emulsoid colloid performs a number of useful functions and materially improves the characteristics and properties of a weighted cement slurry. It enables a weighting material of maximum coarseness of mesh to be employed, because the colloid inhibits settling out of the weighting material. The colloid also brings about a lubrication between the weighting material particles so as to decrease the quasi-dilatant stiffening effect. It is to be noted, however, that the effect of the colloid is directly opposite from the effect of bentonite in a bentonite cement mixture. In the usual bentonite cement mixture, employing 2 to 4% bentonite, the setting time is shortened. Where, however, bentonite is employed in weighted cement slurries, employing bentonite on the order of about one half of one percent, the effect is one of lengthening instead of shortening the setting or pumpability time. This is of advantage in the cementing of wells. It will, therefore, be seen that the effect of adding an emulsoid colloid to a cement slurry containing weighted material is distinctive and gives improved results.

The tables below give examples of slurries made up in accordance with this invention, and show clearly the beneficial effect on setting time of the addition of relative small quantities of bentonite. It will be seen that in each case there is an optimum concentration of bentonite which is to be added. At this optimum concentration, the setting time is at a maximum which of course is a tremendous advantage when working in deep holes, and also is indicative of a slurry with good pumping characteristics. It will also be seen from these data that the addition of the bentonite markedly reduces the tendency of the weighting material to settle out.

In determining the "time to reach 10 points pull," the freshly prepared slurries were placed in a Halliburton Cement Consistometer, a testing device well known in the oil well cement industry, and continuously agitated until the consistometer indicated a slurry thick enough to give 10 points pull on the indicator which corresponds roughly to 1,000 poises viscosity. This is of the order of magnitude of the limit of pumpability.

Table I

[Cement slurries weighted to 20 lbs./gallon with crushed barytes (−10 to +20 mesh), with varying percentages of bentonite (water-cement ratio: 9 gallons per sack).]

| Per cent Bentonite [1] | 0 | 0.1 | 0.2 | 0.3 | 0.5 | 0.75 |
|---|---|---|---|---|---|---|
| Angle of Repose of Slurry degrees | 0–2 | 0–5 | 12 | 15 | 20 | 30 |
| Per cent Settling [2] | 11.5 | 8.8 | 4.5 | 3.5 | 2.0 | 2.0 |
| Time [3] to reach 10 points pull | 78 | 85 | 91 | 315 | 257 | 177 |

Table II

[Cement slurries weighted to 19.1 lbs./gallon with crushed sintered hematite (−20 to +40 mesh), with varying proportions of bentonite (water-cement ratio: 10 gallons per sack).]

| Per cent Bentonite [1] | 0 | 1.5 | 3.0 | 4.0 | 5.0 |
|---|---|---|---|---|---|
| Angle of Repose of Slurry degrees | 0–2 | 28 | 48 | 46 | 42 |
| Per cent Settling [2] | 15 | 3 | 1 | 1.5 | 1 |
| Time [3] to reach 10 points pull | 87 | 90 | 137 | 150 | 50 |

[1] Percentage by weight of cement used.
[2] Bulk volume percent of weight material settling out.
[3] Time in minutes.

Having thus described the invention, what is claimed is:

1. A pumpable, finally settable cement slurry for cementing wells, comprising, hydraulic cement in an amount sufficient to form a slurry, a weighting material in a concentration sufficient to give a slurry density substantially in excess of that of a cement-water slurry of equal viscosity, and an emulsoid colloid in a concentration of approximately one-half per cent based upon the cement, viz., an amount sufficient to prevent dilatant packing of the slurry when pumped.

2. A pumpable, finally settable cement slurry for cementing wells, comprising hydraulic cement in an amount sufficient to form a slurry, a weighting material in a concentration sufficient to give a slurry density substantially in excess of that of a cement-water slurry of equal viscosity, and bentonite in a concentration of approximately one-half per cent based upon the cement, viz., an amount sufficient to prevent dilatant packing of the slurry when pumped.

DELMAR H. LARSEN.

REFERENCES CITED

The following references are of record in the file of this patent:

UNITED STATES PATENTS

| Number | Name | Date |
|---|---|---|
| 1,943,584 | Cross | Jan. 16, 1934 |
| 2,041,086 | O'Brien | May 19, 1936 |
| 2,210,545 | Hamilton, Jr. | Aug. 6, 1940 |
| 2,279,262 | Edwards | Apr. 7, 1942 |
| 2,290,956 | Gruenwald | July 28, 1942 |